UNITED STATES PATENT OFFICE.

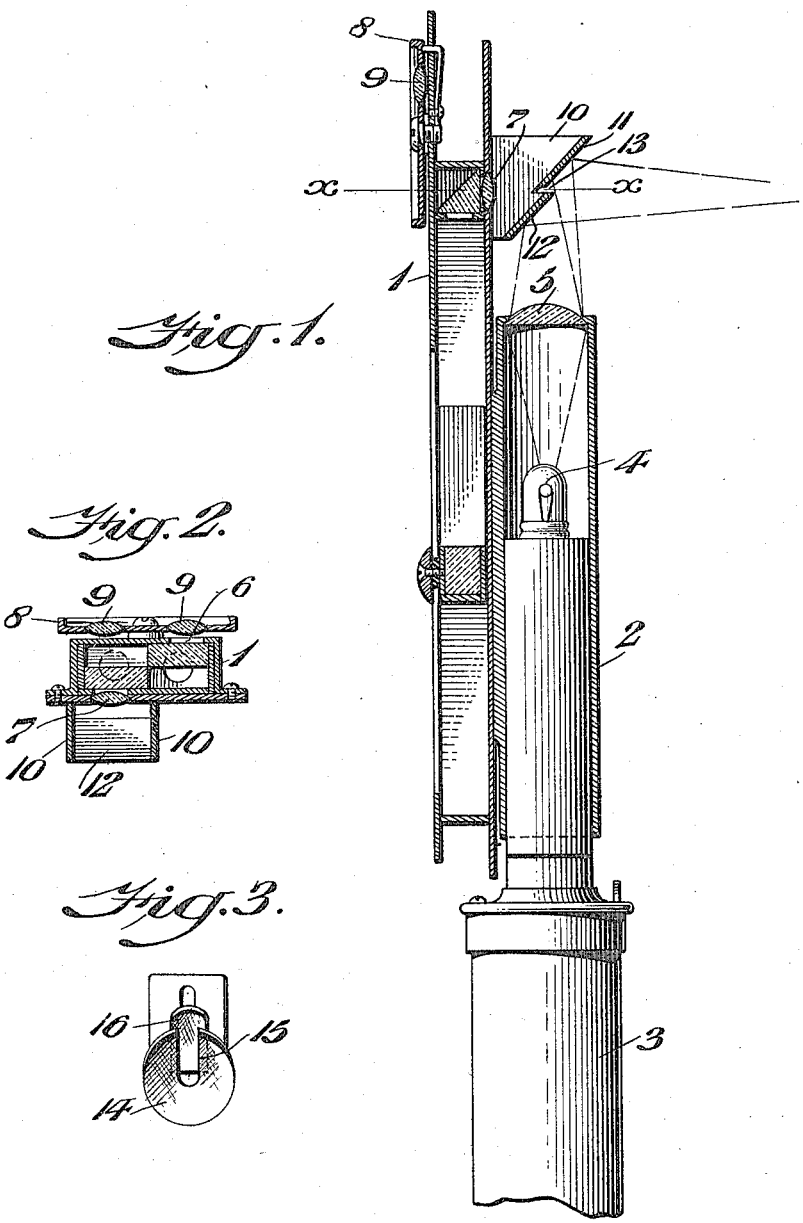

HENRY L. DE ZENG, OF MAPLE SHADE, NEW JERSEY.

OPTICAL INSTRUMENT.

1,152,152.  Specification of Letters Patent.  Patented Aug. 31, 1915.

Application filed January 11, 1915. Serial No. 1,562.

*To all whom it may concern:*

Be it known that I, HENRY L. DE ZENG, a citizen of the United States, residing at Maple Shade, in the county of Burlington, State of New Jersey, have invented a new and useful Optical Instrument, of which the following is a specification.

My invention relates to a new and useful optical instrument, and consists of a new and useful construction of reflecting means for directing light to the object.

It further consists of other novel features of construction, all as will be hereinafter set forth.

It will be understood that my invention is adapted for use on an optical instrument wherein a mirror or reflecting means is employed, and that in the drawings, I have shown the same as applied to one form of an ophthalmoscope, although the device may be used with any form of ophthalmoscope, and the invention is adapted for other instruments and that the arrangement of the parts may be varied, other instrumentalities may be employed, and changes may be made in the construction, which will come within the spirit of my invention, and I do not, therefore, desire to be limited to the exact construction herein shown and described.

Figure 1 is a partial elevation, partial vertical sectional view of an ophthalmoscope showing a reflecting means embodying my invention. Fig. 2 is a sectional view on line $x$—$x$ Fig. 1. Fig. 3 is a front elevation of another form of reflector or mirror which may be employed.

Similar numerals of reference indicate corresponding parts in the figures.

Referring to the drawings:—1 designates the casing of any suitable form or construction, forming the body portion or the support for the operating mechanism, and which is adapted, when applied to an ophthalmoscope, to be connected with the tube 2 thereof, which latter is adapted to be mounted upon the handle 3, which carries a source of light 4, such as an electric lamp, the said tube 2 carrying a lens 5.

It will, of course, be understood that the casing is provided with a suitable sight opening 6, which may or may not be provided with a lens or eye piece, and that the same is also provided with an objective lens 7, suitably mounted upon the casing, and I further provide a disk 8 which is pivotally mounted upon the casing in suitable relation with respect to the sight opening thereof, in which disk are mounted a suitable number of lenses 9 of different power, whereby the said lenses may be successfully brought into alinement with the sight opening, in order to focus or increase or decrease the magnifying power of the instrument. Any suitable means for yieldingly holding the desired lens in operative position may be employed.

10 designates the reflecting means or device, such as a mirror, which is suitably mounted or carried upon the casing 1 in proper position to receive the light from the light source 4 and direct the same to the object. As shown, I have provided a construction of reflecting device, wherein the same is provided with two reflecting surfaces 11 and 12, offset with respect to each other, in order to provide the sight opening 13, through which the object may be viewed, it being understood that the sight opening 13 of the mirror is suitably located with respect to the objective and the sight opening of the ophthalmoscope for viewing the object.

In Fig. 3, I have shown a form of mirror or reflector which may be employed, if desired, with the same effect as the construction already described, and in which the section 14 of the reflector surface is provided with a slot 15, and a section 16 of the reflector surface is offset therefrom rearwardly, the said latter section being held in position in any suitable or desired manner, so that the vision of the operator is not obstructed, since a sight opening is provided by the relative position of the two surfaces as before.

From the above it will be understood that I have devised a new and novel reflector having reflecting means with a part thereof offset from the plane thereof to provide a sight opening and preferably with the upper edge of the lower reflecting surface suitably positioned with respect to the lower edge of the upper reflecting surface to prevent the light from the light source from passing through the sight opening, as will be evident.

Having thus described my invention, what I claim as new and desire to secure by Letters Patent, is:—

1. A reflector formed with an angularly disposed reflecting surface, and with a portion thereof offset from the plane thereof, with the edges spaced apart.

2. An optical instrument having a reflector placed at an oblique angle with respect to incident rays of light, said reflector presenting a plurality of reflecting surfaces, which are located in different planes with respect to each other, and providing a sight opening therebetween.

3. In an optical instrument, a reflector angularly disposed with respect to incident rays from a source of light, the component parts of said reflector being located in different planes, the part nearest to the said light source being positioned anterior to the portion farthest removed therefrom, forming an opening therebetween and preventing light from said source from directly entering the said opening.

4. A reflector formed of a plurality of reflecting surfaces offset from each other and forming a sight opening therebetween and with the edge of one member so located with respect to the edge of another member as to prevent obliquely disposed incident rays of light emanating from a given direction from entering the said sight opening.

5. In an optical instrument provided with a source of light and having a reflector composed of a plurality of reflecting surfaces located in different planes with respect to each other and angularly disposed to incident rays of light from said light source, the reflecting surfaces of said reflector being so arranged as to provide a sight opening therebetween, while at the same time excluding light from the said light source.

6. A reflector adapted for use with a source of light composed of a plurality of reflecting surfaces arranged in different planes, the central edge of the portion farthest removed from the light source lying in a plane posterior to the central edge of the portion located nearest to the light source and so located with respect to each other as to provide means for viewing an object therethrough.

7. In an optical instrument, a suitable support, a source of light, a reflector composed of a plurality of parts, one part thereof being offset from the plane of another part thereof and angularly disposed to incident rays of light from said source, one part of said reflector being so positioned with respect to another part thereof as to provide means for viewing an object therebetween and at the same time preventing light, from said source, from passing through the reflector.

HENRY L. DE ZENG.

Witnesses:
B. S. ALDRIDGE,
F. W. FIRZ.

Copies of this patent may be obtained for five cents each, by addressing the "Commissioner of Patents, Washington, D. C."